April 2, 1935.  A. MARVOLL  1,996,681
BAITING STOOL
Filed Jan. 15, 1934   2 Sheets-Sheet 1
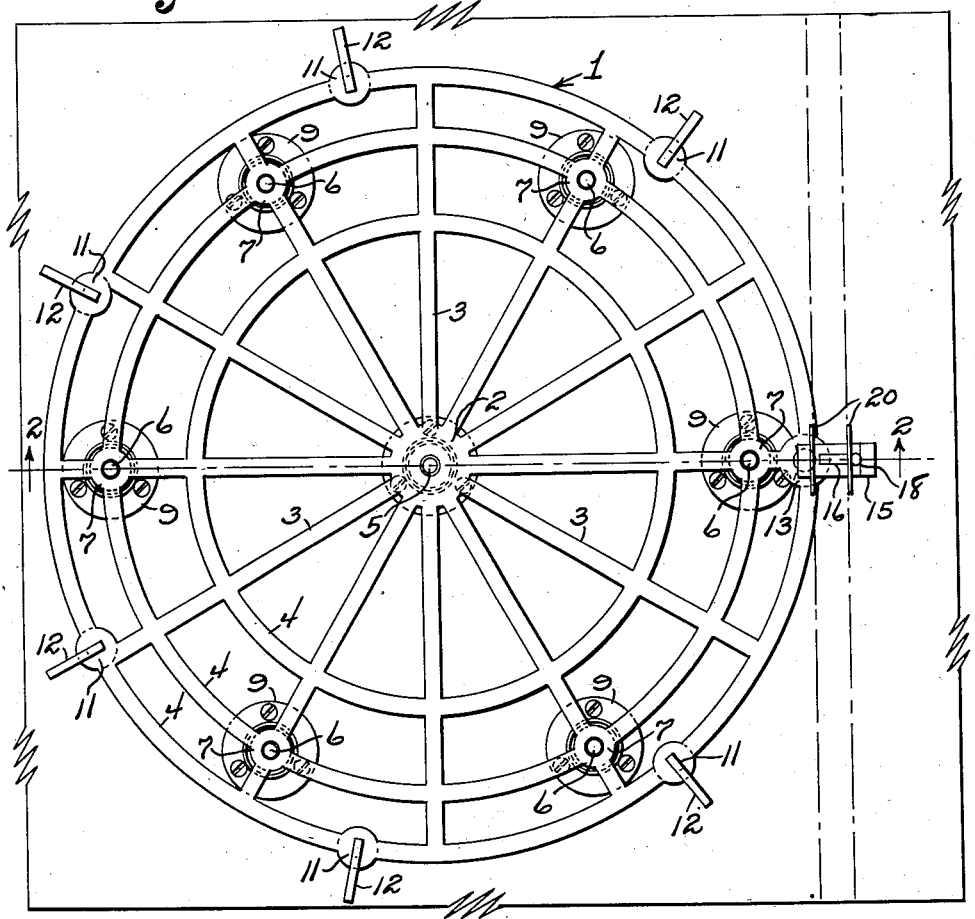
Fig. 1.
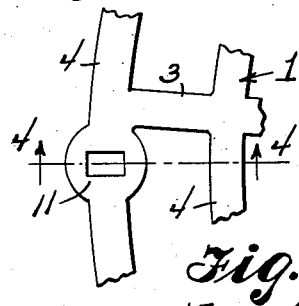
Fig. 3.
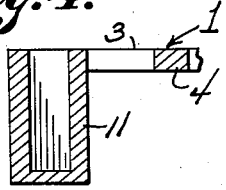
Fig. 4.
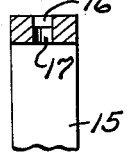
Fig. 6.
Fig. 7.
Fig. 5.
Fig. 8.
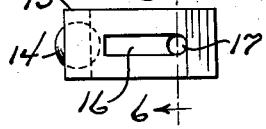
Almar Marvoll INVENTOR
BY Victor J. Evans & Co.
ATTORNEY

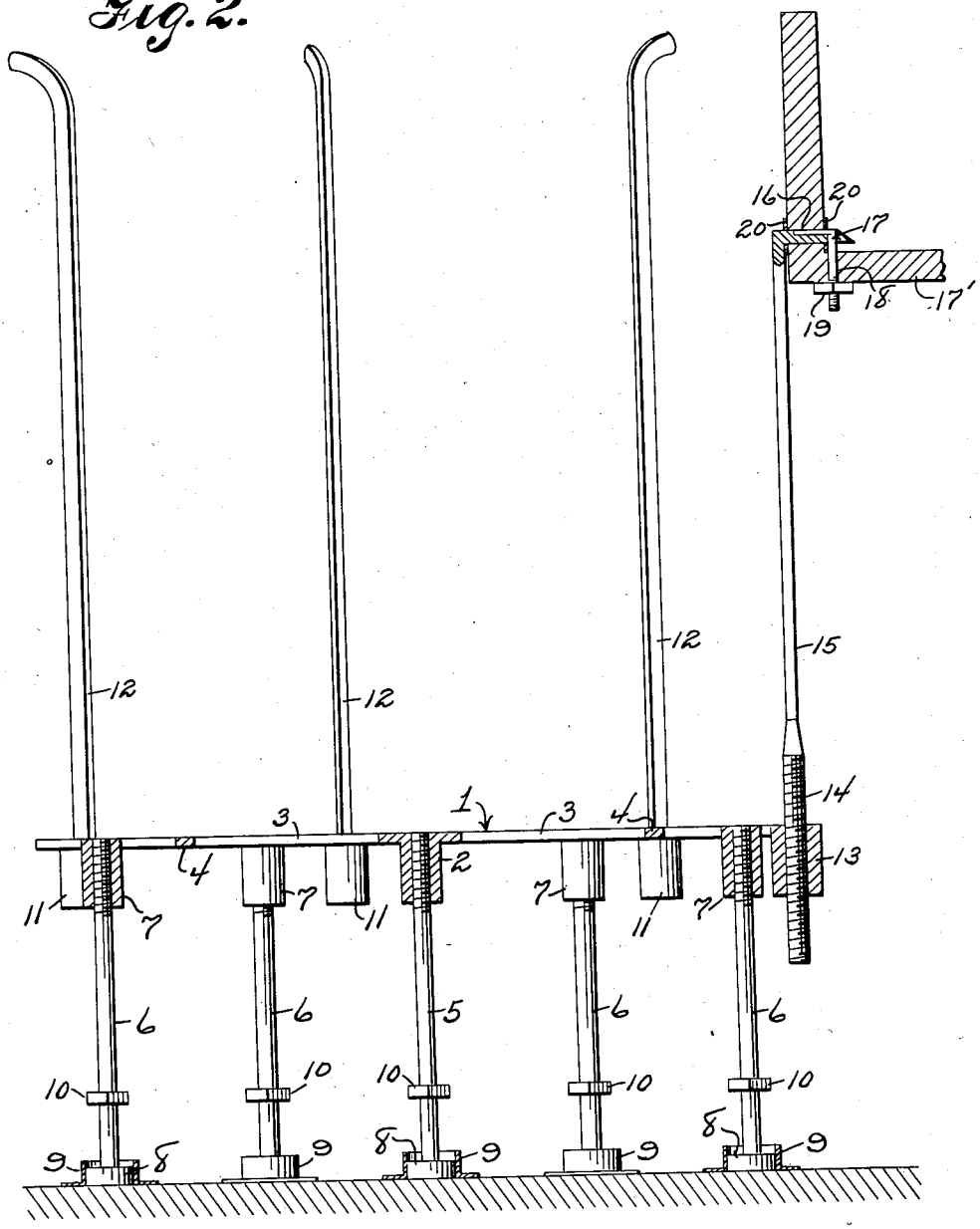

Patented Apr. 2, 1935

1,996,681

UNITED STATES PATENT OFFICE 1,996,681

BAITING STOOL

Almar Marvoll, Seattle, Wash.

Application January 15, 1934, Serial No. 706,743

2 Claims. (Cl. 43—4)

This invention relates to baiting stools and has for the primary object the provision of a device which is especially adapted for aiding fishermen while at sea and under all weather conditions to easily and quickly bait and wind fishing lines into coiled formation ready for use and which heretofore has been found practically impossible when the boat is rolling or pitching due to bad weather conditions or rough sea.

With these and other objects in view this invention consists in certain novel features of construction, combination and arrangement of parts to be hereinafter more fully described and claimed.

For a complete understanding of my invention, reference is to be had to the following description and accompanying drawings, in which Figure 1 is a top plan view illustrating a baiting stool constructed in accordance with my invention.

Figure 2 is a sectional view taken on the line 2—2 of Figure 1.

Figure 3 is a fragmentary plan view of the base or frame of the stool.

Figure 4 is a detail sectional view taken on the line 4—4 of Figure 3.

Figure 5 is a plan view illustrating a connecting rod or member employed between the stool and a bait rack.

Figure 6 is a sectional view taken on the line 6—6 of Figure 5.

Figure 7 is a side elevation illustrating a clamp used in connection with the connecting member.

Figure 8 is an end view illustrating the clamp.

Referring in detail to the drawings, the numeral 1 indicates a base or frame of annular and skeleton formation and consists of a hub 2 having integral therewith radially extending spokes 3 for supporting a series of annular members 4. The annular members 4 are relatively spaced and are integral with the spokes 3. The hub 2 is internally screw threaded to receive the screw threaded end of a supporting leg 5 and cooperating with the leg 5 in supporting the frame or base is a series of legs 6 threaded into screw threaded sockets 7 formed integral with the intermediate annular member 4. The legs are all of the same construction and formed integrally with their lower ends are heads 8 received within cups or socket elements 9, the latter being flanged and are adapted to rest on the deck of a ship and to be secured to said deck by screws or like fasteners extending through the flanges. The legs are provided with wrench engaging faces 10 so that said legs may be turned for the purpose of leveling the base or frame.

The outer annular member 4 has formed integrally therewith a series of relatively spaced sockets 11 to removably support upstanding bars or members 12 each having its upper end curved outwardly. The outer annular member 4 also has integral therewith a screw threaded sleeve 13 to receive the screw threaded end 14 of a bait rack connecting member 15, the upper end of which is bent at right-angles and grooved, as shown at 16, and also provided with an aperture 17. The right-angle end of the member 15 extends through a slot in the wall of a bait rack 17'. A hook-shaped clamp or member 18 extends through the aperture 17 with its bill portion lying in the groove 16 while the shank thereof extends through an opening in the bait rack to receive a nut 19. The nut 19 turned tightly against the wall of the rack 17' will draw the right-angle end of the member 15 tightly against one of the walls of the slot in said bait rack. The bait rack at opposite ends of the slot thereof is provided with wear plates 20.

The device heretofore described provides a very efficient device on which a fishing line may be coiled during the baiting of the hooks on said line. In deep sea fishing, fishing lines are made up of great length and consist of a main line having secured thereto a plurality of auxiliary lines each of which carries a hook or hooks. It is the practice to arrange these lines in coiled formation so that they can be easily handled and played out from the ship. When a line is drawn in and the fish removed it is necessary to bait the hooks and to facilitate this operation my invention is employed. The line is coiled inside of the uprights or members 12 and as each auxiliary line is reached during the winding of the main line, the hooks are baited from bait taken from the bait rack 17'. After baiting the hooks each auxiliary line is folded inwardly within the coil being formed from the main line inside of the uprights or members 12. After completion of the coiling operation of the main line certain of the uprights or members 12 are removed so that the coiled main line with the baited hooks arranged inwardly of the coil is lifted off of the stand and tied in a suitable manner to prevent uncoiling of the line until it is desired to play the baited line out from the ship.

Having described the invention, I claim:

1. A baiting stand comprising a horizontally arranged frame, means for supporting said frame, socketed members carried by said frame, uprights removably received by said socketed members and having their upper ends curved outwardly, and adjustable means on the frame for supporting a bait rack.

2. A baiting stand comprising a horizontally arranged frame, means for adjustably supporting the frame, means removable from the frame inside of which a line may be coiled, a connecting member adjustably secured to the frame, and a bait trough removably attached to the connecting member.

ALMAR MARVOLL.